United States Patent [19]

Fan

[11] Patent Number: 5,419,532

[45] Date of Patent: May 30, 1995

[54] VALVE SEAL

[75] Inventor: Fandy J. Y. Fan, Sugar Land, Tex.

[73] Assignee: PBV-USA, Inc., Houston, Tex.

[21] Appl. No.: 93,804

[22] Filed: Jul. 19, 1993

[51] Int. Cl.$^6$ .............................................. F16K 5/06
[52] U.S. Cl. ................................ 251/315.08; 251/317; 251/315.13
[58] Field of Search ........ 251/210, 315, 317, 315 TR, 251/315 RC

[56] References Cited

U.S. PATENT DOCUMENTS

| | | | |
|---|---|---|---|
| 3,746,303 | 7/1973 | Grove et al. | 251/159 |
| 3,765,647 | 10/1973 | Grove et al. | 251/317 |
| 3,972,507 | 8/1976 | Grove | 251/172 |
| 4,163,544 | 8/1979 | Fowler et al. | 251/315 TRX |
| 4,552,335 | 11/1985 | Alexander et al. | 251/317 X |

OTHER PUBLICATIONS

PBV Specifications Series 5700/6700 2"–24" Type, pp. 1-8.
PBV Specifications Series 5660/6660 2"–12" Type, Pages.
PBV-USA Pipeline Ball Valves.

Primary Examiner—John C. Fox
Attorney, Agent, or Firm—John R. Casperson

[57] ABSTRACT

A design for a ball valve seat uses elastomer and a hard material such as graphite or plastic to seal both high and low pressures. The seat is ring shaped. The seal is positioned on one end. In one embodiment, a rubber O-ring is installed in an outer groove, a plastic ring is installed in the inner groove. In another embodiment, the rubber is chemically heat bonded on the outside diameter of the plastic ring. The combination insert is installed in a single groove. Under low pressure, the rubber ring is compressed by a backing spring and urged against the ball to complete the seal. At higher pressures, the rubber ring is compressed more until the plastic ring contacts the ball. By the time the pressure reaches the initial plastic sealing pressure (below 1000 psig by design) the pressure between rubber ring and plastic ring will be the initial plastic sealing pressure. The low pressure zone will remain low pressure even when the upstream pressure is further increased. When the valve is turning to open and passes the rubber ring, the low pressure will be released while the high pressure is still sealed by the plastic ring. When the valve passes the plastic ring, the high pressure will be released while the rubber is away from the high speed cutting flow so that the rubber ring will not be damaged by the flow.

4 Claims, 3 Drawing Sheets

VALVE SEAL

BACKGROUND OF THE INVENTION

In one embodiment, this invention relates to a composite seal such as a composite seal for a valve seal ring. In another embodiment, this invention relates to a seal ring such as a seal ring for a valve. In yet another embodiment, this invention relates to a ball valve, such as a trunnion ball valve, having improved sealing capabilities. In a still further embodiment, this invention relates to a method for protecting a seal in a valve from damage by high velocity fluids.

A common seat design of a trunnion mounted ball valve utilizes an O-ring fitted into a groove and retained by a metal snap ring. The exposed portion of the O-ring makes contact with the ball. With the spring force from behind the seat, the O-ring is compressed tightly against the ball and completes the seal. The advantage of the rubber seal is its flexibility. The disadvantage is its low strength. When the sealing pressure approaches 1800 psig the O-ring will be damaged when the ball is cracked open. The rubber O-ring just can not stand the explosive super high speed flow. Another problem encountered when using O-ring seals at high pressure differences is that the O-ring may become squeezed flat, permitting metal to metal contact between the ball and the seat. High torque may be required to break loose the valve, necessitating a larger motor in motor operated valves and possibly creating a safety problem. Another disadvantage is that an extra machining operation is required to provide a groove to accommodate the snap ring required to retain the O-ring.

One way to overcome this problem is to insert a hard, high tensile plastic fitted into a groove in the valve seat. The material can be Nylon (synthetic polymeric amide which has recurring amide groups as an integral part of the main polymer chain), Teflon (polytetrafluroethylene), Delrin (linear polyoxymethylene-type acetal resin), or PEEK (polyetheretherketone) for example. These plastics are 5 to 20 times stronger than most rubbers.

The advantage is that the high speed flow will not cut the plastics. The disadvantage is that the hardness of the plastics makes full sealing contact with the ball difficult when the pressure is low. As a matter of fact, unless the ball is perfectly round, the surface is perfectly smooth, and the spring force very large, the plastic insert will not seal low pressure. This can create safety problems in applications where a low pressure difference may be experienced across the valve, such as in metering applications. The high spring force causes another problem. The torque required to turn the valve at low pressures is higher than the torque required to turn an O-ring sealed valve at low pressures. The higher torque requirement necessitates using a larger motor in motor operated valves, an additional expense. Another disadvantage is that a machining operation is generally required alter the plastic insert is positioned, in order to provide sufficient trueness for sealing.

OBJECTS OF THE INVENTION

It is an object of this invention to provide a seal means for a valve which will seal across both high and low pressure drops.

It is another object of this invention to provide a seal means for a valve which has the advantages of an O-ring seal at low pressure drops and the advantages of a plastic ring seal at high pressure drops.

It is a still further object of this invention to provide a seal means for a valve which resists damage from exposure to high speed fluid flow, such as when the valve is cracked open.

It is yet another object of this invention to provide a seal means for a valve which can be deployed with a minimum of machining operations.

SUMMARY OF THE INVENTION

In one embodiment of the invention there is provided a seal especially well adapted for vane seat rings, especially vane seat rings for use in ball valves. The seal comprises an inner ring made from a hard seal material such as graphite or plastic and an outer ring made from an elastomeric material, such as rubber. The inner ring has a first end and a second end connected by a generally tubular sidewall. The inner ring has a generally frustoconically shaped first end surface at the first end converging in the direction of the second end. The generally frustoconically shaped first end surface meets the outer surface of the generally tubular sidewall along an edge at the first end of the inner ring. The outer rubber ring is bonded to the inner ring. The outer rubber ring has a first end and a second end and a generally tubular sidewall connecting the first end with the second end. The generally tubular sidewall of the outer rubber ring is in covering relationship with the generally tubular sidewall of the inner plastic ring. The first end of the outer rubber ring extends past the outer edge of the inner plastic ring.

This embodiment of the invention combines the virtues of both plastic or graphite ring seals and rubber ring seals in one article. The seal is functional over a wide pressure range. It does not require a retention ring for reliable positioning or a machining operation to meet sealing specifications after installation on a valve seat ring. Only a single groove in the seat ring is required to accommodate the composite seal.

In another embodiment of the invention, there is provided a valve seat assembly especially well adapted for use in ball valves. The assembly comprises a seat ring having a first end and a second end and a hard seal/soft seal combination positioned generally circumferentially on the first end of the seat ring. The hard seal/soft seal combination comprises a ring-shaped elastomeric seal portion and a ring-shaped plastic or graphite seal portion. The ring-shaped plastic or graphite seal portion is spaced radially inwardly from the ring-shaped elastomeric seal portion.

The seal ring in this embodiment of the invention can be employed to retrofit existing valves to provide the benefits of the invention as well as to fit new valves. It also provides a convenient repair part to service leaking valves. Durability of the seal ring can be enhanced further utilizing a composite seal as described above and by machining recessed areas in the single seal retention groove to lock the seal in position and to provide a recess to shield the elastomeric seal when the valve is cracked open during high pressure operations.

In another embodiment of the invention, there is provided a ball valve. The ball valve includes a ball valve housing, a ball valve member, and a ring-shaped ball valve member seat. The ball valve housing has a port for flow of fluid. The ball valve member is rotatably positioned in the ball valve housing. The ball valve member has a generally spherical valve closed face and a generally open flow passage face. The passage through the ball valve member opens onto the flow passage face. The ball valve member is movable from a first position to block fluid flow through the port by alignment of the closed face with the port to a second position which provides for fluid flow through the port by alignment of the passage face with the port. At least one generally ring-shaped ball valve seat is mounted in the ball valve housing peripherally around the port. The ball valve seat has a first end facing the ball valve and a second end which faces the ball valve housing. The ball valve seat has an inside chamfer on the first end to closely accommodate the generally spherical closed valve face of the ball valve member. A seal assembly is positioned generally circumferentially on the first end of the ball valve seat. The seal assembly comprises a ring-shaped elastomeric seal portion and a ring-shaped hard seal portion. The ring-shaped hard seal portion is spaced radially inwardly from the ring-shaped elastomeric seal portion.

As described, this embodiment of the invention can be practiced with both floating ball valves and trunnion ball valves, but it is especially well suited for use in trunnion ball valves. In such applications, the valve housing will generally have an inlet port and an outlet port and ball valve seats according to the invention will be positioned at each port. At low pressure differentials, the elastomeric seal portion engages the ball to provide the seal. At higher pressure differences, the hard seal portion engages the ball. Use of the inventive seal assembly provides reliable sealing of the valve over a wide range of pressures. It also provides easier opening and closing of the valve. At low pressure, resistance to turning is caused largely by spring forces urging the valve seats toward the ball valve. Since the elastomeric portion of the seal engages at low pressure, weak springs can be used and the valve will be easy to turn. At high pressures, the plastic portion of the seal prevents metal to metal contact and maintains ease of valve turning. Since the valve is easy to turn at both low and high pressure differences, a smaller motor can be used in the case of motor operated valves, resulting in further savings and efficiency.

In a still further embodiment of the invention there is provided a method for protecting a rubber O-ring type seal in a ball valve seat from cutting fluid flow from a high pressure zone to a low pressure zone when the ball valve is cracked open. The method comprises providing a hard ring seal on the ball valve seat between the O-ring type seal and the high pressure zone. The seal line of the O-ring type seal is spaced apart from the seal line of the hard ring seal to establish a medium pressure zone between the O-ring type seal and the hard ring seal. The ball valve is cracked open past the O-ring type seal sufficiently to release the medium pressure, which will not cut the seal, then cracked open past the plastic ring seal sufficiently to release the high pressure fluid at a position spaced apart from the O-ring type seal so as to avoid cutting the O-ring type seal.

DETAILED DESCRIPTION OF THE PREFERRED EMBODIMENTS

In one embodiment of the invention there is provided a method for protecting a rubber O-ring type seal in a ball valve seat from cutting fluid flow from a high pressure zone to a low pressure zone when the ball valve is cracked open. The method comprises providing a hard ring seal on the ball valve seat between the O-ring type seal and the high pressure zone. The seal line of the O-ring type seal is spaced apart from the seal line of the hard ring seal to establish a medium pressure zone between the O-ring type seal and the hard ring seal. In operation, the ball valve is cracked open past the O-ring type seal sufficiently to release the medium pressure, which will not cut the seal, then cracked open past the plastic ring seal sufficiently to release the high pressure fluid at a position spaced apart from the O-ring type seal so as to avoid cutting the O-ring type seal.

Figure 1:
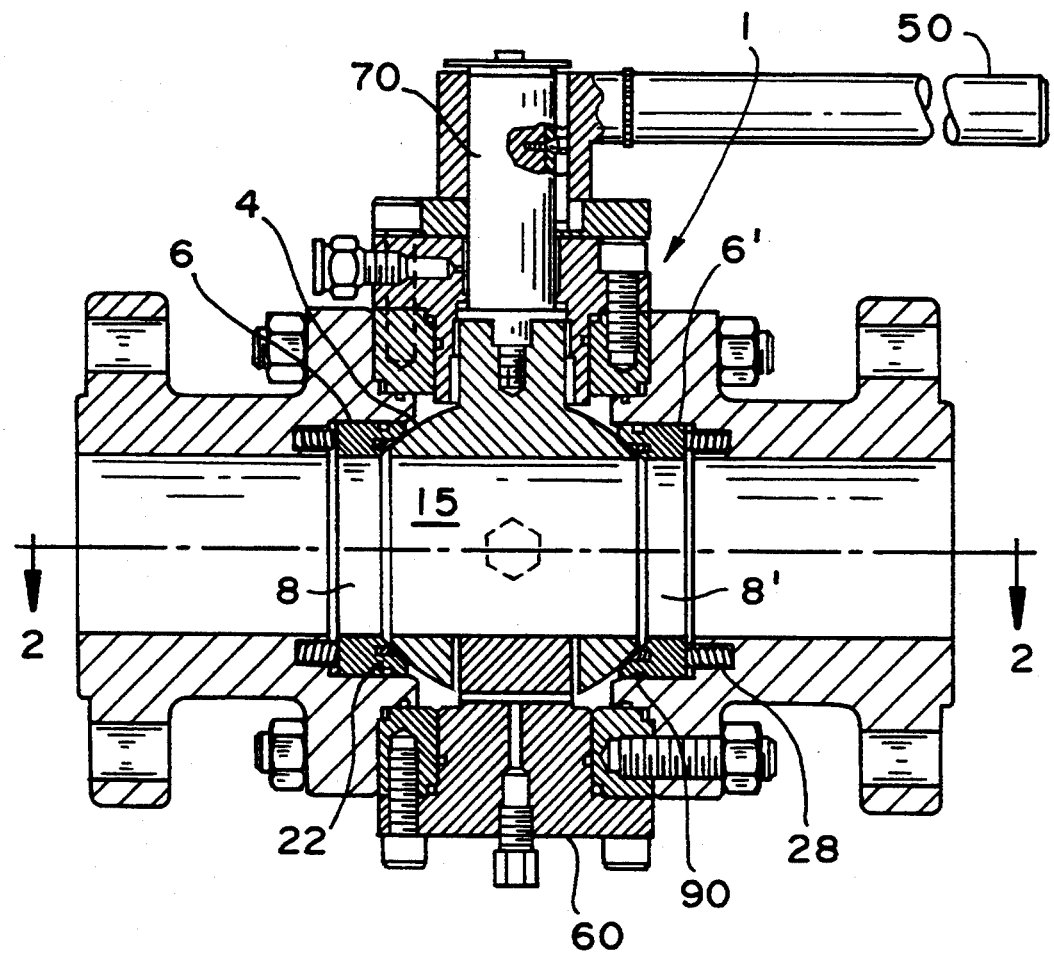
FIG. 1 is a side sectional view of a ball valve embodying certain feature of one embodiment of the present invention.
Figure 2:
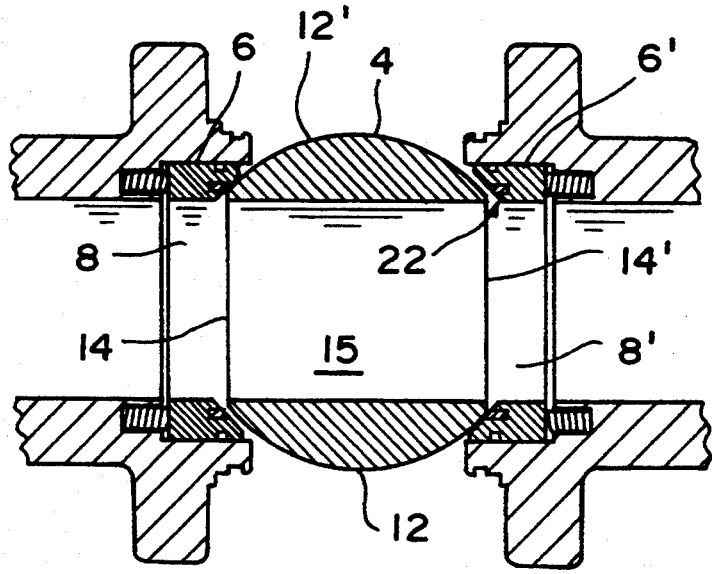
FIG. 2 is a top cross sectional view of the ball valve of FIG. 1 when viewed along lines 2—2 but with part of the housing removed.

Referring to FIG. 1, ball valves in which the invention can be practiced generally include a ball valve housing 1, a ball valve member 4, and a ring-shaped ball valve member seat 6. The ball valve housing has a port for flow of fluid. In the illustrated embodiment, the valve has a pair of ports 8, 8'. The ball valve member is rotatably positioned in the ball valve housing. The ball valve member has a generally spherical valve closed face and a generally open flow passage face. In the illustrated embodiment, the valve has a pair of closed faces 12, 12' and a pair of open faces 14, 14'. The passage 15 through the ball valve member opens onto the flow passage face. The ball valve member is movable from a first position to block fluid flow through the port by alignment of the closed face 12 with the port 8 (FIG. 3) to a second position which provides for fluid flow through the port 8 by alignment of the passage face 14 with the port 8 (FIG. 2). At least one generally ring-shaped ball valve seat is mounted in the ball valve housing peripherally around the port. As illustrated, ball valve seats 6, 6' are mounted around ports 8, 8'.

Figure 3:
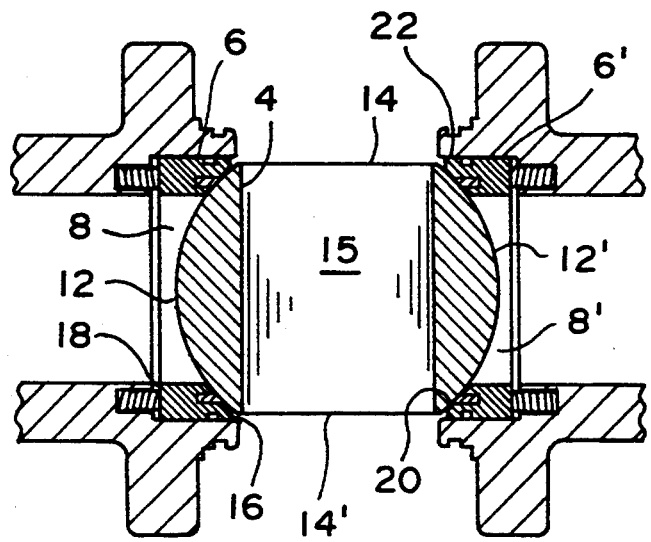
FIG. 3 is a top cross sectional view of the ball valve as in FIG. 2 but with the ball rotated 90 degrees to a sealing position.
Figure 4:
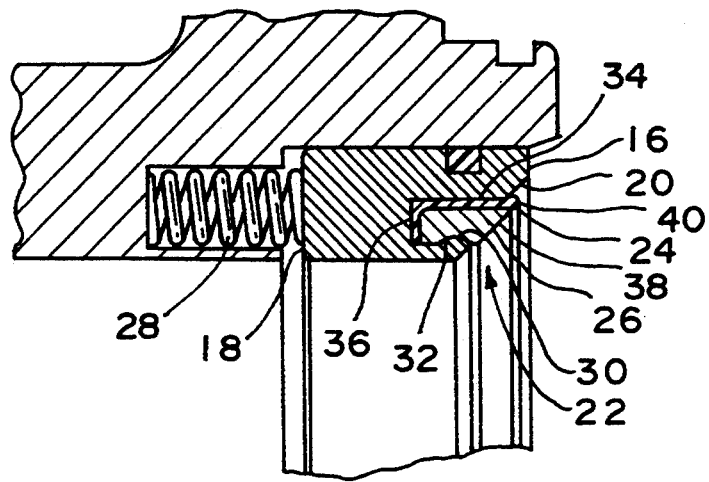
FIG. 4 is an enlarged cross sectional view of a portion of the ball valve as shown in FIGS. 1-3 illustrating certain details of one embodiment of the invention.

Referring to FIGS. 3 and 4, the ball valve seat 6 has a first end 16 facing the ball valve and a second end 18 which faces the ball valve housing 2. The ball valve seat 6 has an inside chamfer 20 on the first end to closely accommodate the generally spherical closed valve face 12 of the ball valve member. A seal assembly 22 is positioned generally circumferentially on the first end of the ball valve seat 6. The seal assembly 22 generally comprises a hard seal/soft seal combination, usually a ring-shaped elastomeric seal portion 24 and a ring-shaped hard seal portion 26. The ring-shaped hard seal portion is spaced radially inwardly from the ring-shaped elastomeric seal portion.

Generally speaking, a means 28 is positioned between the ball valve seat and the ball valve housing for biasing the ball valve seat toward the ball valve. Many types of spring designs are suitable, but generally coil or wave springs are used. The strength of the spring should be adequate to seal the rubber portion of the seal. Stronger springs are unnecessary. A seat seal such as at least one O-ring 90 is also generally used. The seat seal is mounted circumferentially on the valve seat 6. The valve assembly shown in FIG. 1 is also provided with a handle 50 which is connected to the ball 4 by a valve stem 70. The handle is used to open and shut the valve. The end of the ball 4 opposite to stem 70 is supported by trunnion 60.

In a preferred embodiment, the hard seal/soft seal combination is positioned generally circumferentially on the first end of the seat ring. The hard seal/soft seal combination comprises a ring-shaped elastomeric seal portion and a ring-shaped plastic or graphite seal portion. The ring-shaped plastic or graphite seal portion is spaced radially inwardly from the ring-shaped elastomeric seal portion. The elastomeric seal portion generally protrudes from the seal face a slightly greater distance than the hard seal.

Figure 5:
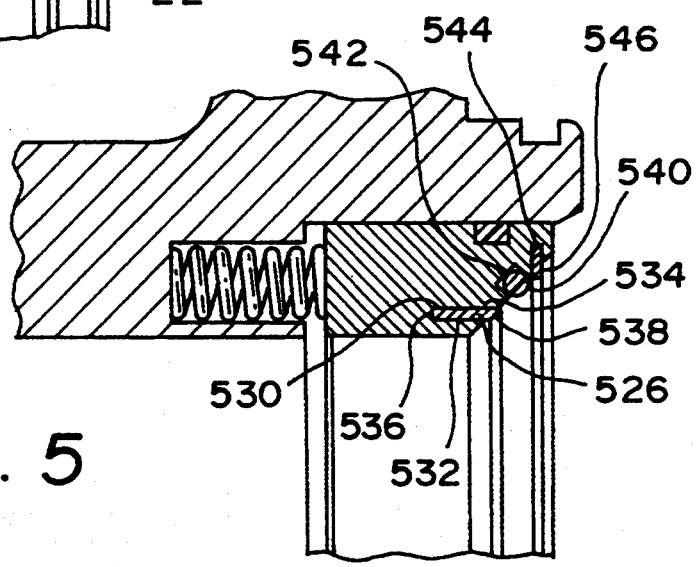
FIG. 5 is a view of another embodiment of the invention taken from the same perspective as FIG. 4.
Figure 6:
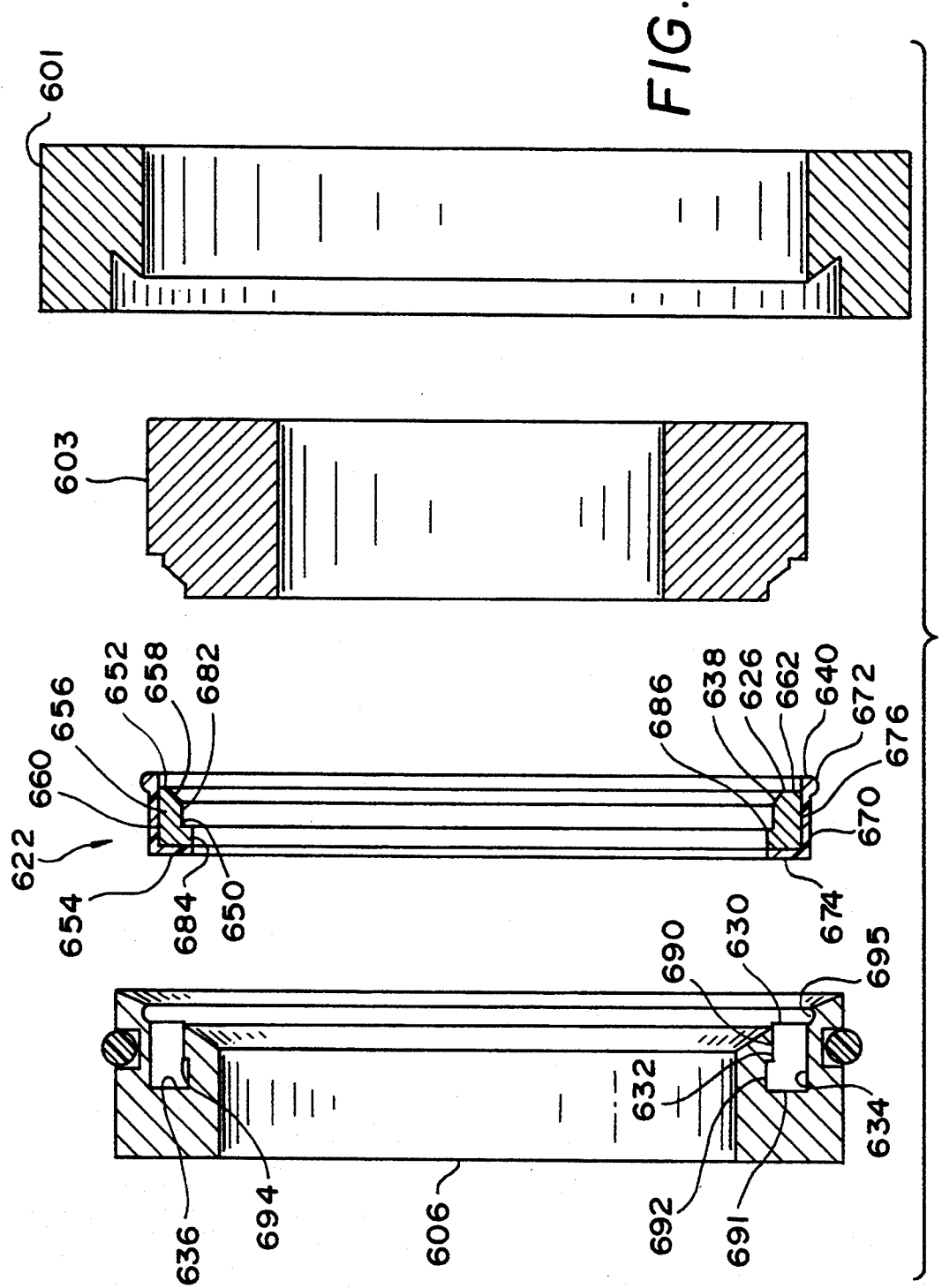
FIG. 6 is an exploded cross-sectional view of another embodiment of the invention showing additional details and assembly techniques.

Generally speaking, the seat ring 6 has a generally circumferentially extending first groove 30 cut in a longitudinal direction into the seat ring from the generally frustoconical surface at the first end of the seat ring. The groove is defined by an inner sidewall 32, an outer sidewall 34, and a bottom wall 36. In FIG. 5, the groove 530 has inner sidewall 532, outer sidewall 534, and bottom wall 536. In FIG. 6, the ring 606 has groove 630 defined by inner sidewall 632, outer sidewall 634 and bottom wall 636. The ring-shaped hard seal portion 26, 526, 626 has a generally tubular shape with a first end having an inner chamfer 38, 538, 638 protruding slightly from the generally frustoconical surface at the first end of the seat ring. The first end of the hard seal portion is generally chamfered at an angle of about 45 degrees with respect to the longitudinal axis of the valve seat assembly. The ring shaped elastomeric seal portion comprises an O-ring type seal 40, 540, 640 protruding a slightly greater distance from the frustoconical surface than the ring-shaped hard seal portion, such as on the order of 0.010 to about 0.040 inches further, depending mostly on valve diameter. The hard seal portion can protrude from the ring surface any desired amount, but should be sufficient to prevent metal to metal contact when the valve is used. Generally speaking, a protrusion in the range of 0.020 up to 0.100 inches is expected to provide good results, especially in the range of 0.030 to about 0.060 inches.

In the FIG. 5 embodiment, the O-ring type seal constitutes a separate O-ring. In this embodiment, the first end of the seat ring preferably further defines a generally circumferentially extending second groove 542 extending into the seat ring generally normally from the generally frustoconical surface at the first end of the seat ring. The second groove is spaced generally radially outwardly from the first groove. The seal 540 is positioned in the second groove. In order to better retain the O-ring 540, the first end of the seat ring preferably further defines a generally circumferentially extending third groove 544 cut into the seat ring generally radially from the generally frustoconical surface at the first end of the seat ring. The third groove is spaced closely adjacent to and radially outwardly from the second groove 542. A retention ring 546 is mounted in the third groove. The ring 546 protrudes generally radially inwardly from the generally frustoconical surface at the first end of the seat ring sufficiently to retain the O-ring seal 540 in the second groove 542.

In the embodiment of the invention shown in FIGS. 4 and 6 the seal comprises an inner ring made from a hard seal material such as graphite or plastic and an outer rubber ring. Suitable plastics are Nylon, Teflon, Delrin, and PEEK for example. The outer ring can be made from a wide range of elastomer materials. Buna N rubber is highly suitable for many applications. With reference to FIG. 6, the inner ring 650 has a first end 652 and a second end 654 connected by a generally tubular sidewall 656. The ring has a generally frustoconically shaped first end surface 658 at the first end 652 converging in the direction of the second end 654. The generally frustoconically shaped first end surface meets the outer surface 660 of the generally tubular sidewall along an edge 662 at the first end of the inner ring.

The outer rubber ring 670 preferably is bonded to inner ring such as by heat or adhesive. The outer rubber ring has a first end 672 and a second end 674 and a generally tubular sidewall 676 connecting the first end with the second end. The generally tubular sidewall of the outer rubber ring is in covering relationship with the generally tubular sidewall of the inner plastic ring.

The first end of the outer rubber ring extends past the outer edge of the inner plastic ring preferably forming a bead 640 as previously discussed. The bead 640 at the first end of the outer ring preferably forms a generally radially outwardly extending lip. The outer edge 662 of the inner ring is positioned closely adjacent to the bead 640.

The inner ring 650 has a first generally cylindrical inside surface having a first inside diameter 682 adjacent to its first end and a second generally cylindrical inside surface having a second inside diameter 684 adjacent to its second end which is smaller than the first inside diameter. An annular shoulder 686 joins the first generally cylindrical surface with the second generally cylindrical surface.

In a preferred embodiment, the inner ring is formed from plastic or graphic and has a generally annularly shaped second end 654 and a blunted first end 652. The outer ring is formed from rubber and has a generally annular wall at its second end 652 extending generally radially inwardly from the generally tubular sidewall of the outer rubber ring. The generally annular wall of the outer rubber ring is in covering relationship with the generally annular second end of the inner plastic ring. The outer ring 670 forms a layer against the bottom wall 691 of the groove 630 and against the outer sidewall of the groove.

Preferably, the inner sidewall of the first groove has a first generally cylindrical sidewall portion 690 defining a first inner diameter adjacent to the generally frustoconical surface of the tubular member and a second generally cylindrical sidewall portion 692 having a second inside diameter adjacent to the bottom wall 691 of the groove 630. The second diameter is smaller than the first diameter. A generally annular wall 694 connects the first generally cylindrical sidewall portion 690 with the second generally cylindrical sidewall portion 692.

The seat ring preferably further defines a generally circumferentially extending groove 695 cut in a generally radial direction into the seat ring from the outer sidewall of the first groove at a location near the frustoconical surface at the first end of the seat ring. The groove 695 is sized and positioned to receive a portion of the bead when the bead is deflected generally radially outwardly to provide additional protection for the bead when the valve is opened.

Installation of seal 622 in valve ring 606 is illustrated in FIG. 6. Collar 601 engages ring 606. Seal 622 is started into groove 630. Forcing cone 603 rides inside collar 601 and presses seal 622 into the groove 630. The annular wall 686 on the seal 622 engages the annular wall 694 on the valve ring 606 to lock the seal into position.

While certain preferred embodiments of the invention have been described herein, the invention is not to be construed as so limited, except to the extent such limitations are found in the claims.

What is claimed is:

1. A composite seal comprising an inner ring formed from a hard seal material having a first end and a second end and a generally tubular sidewall having an outer surface connecting the first end and the second end, said ring having a generally frustoconically shaped first end surface at the first end converging in the direction of the second end of the inner ring and connected to the outer surface of the generally tubular sidewall along an outer edge at the first end of the inner ring;

an outer rubber ring formed from an elastomeric seal material having a first end forming a bead, a second end and a generally tubular sidewall connecting the first end with the second end, said outer ring being bonded to said inner ring, the generally tubular sidewall of the outer ring being in covering relationship with the generally tubular sidewall of the inner ring;

wherein the outer edge of the inner ring is positioned closely adjacent to the bead and the first end of the outer ring extends past the outer edge of the inner ring;

wherein the inner ring has a first generally cylindrical inside surface having a first inside diameter adjacent to its first end and a second generally cylindrical inside surface having a second inside diameter adjacent to its second end which is smaller than the first inside diameter, an annular shoulder joining the first generally cylindrical surface with the second generally cylindrical surface, and the generally frustoconically shaped end surface of the inner ring converges toward the longitudinal axis of the composite seal at an angle of about 45 degrees and the bead at the first end of the outer ring forms a generally radially outwardly extending lip; and wherein the inner ring is formed from plastic or graphite and has a generally annularly shaped second end and a blunted first end and the outer ring is formed from rubber and has a generally annular wall at its second end extending generally radially inwardly from the generally tubular sidewall of the outer rubber ring, the generally annular wall of the outer rubber ring being in covering relationship with the generally annular second end of the inner plastic ring.

2. A valve seat assembly comprising:

a seat ring having a first end and a second end, the first end forming a generally frustoconical surface which converges from the first end toward the second end of the seat ring;

a hard seal/soft seal combination positioned generally circumferentially on the first end of the seat ring, the hard seal/soft seal combination protruding slightly from the frustoconical surface of the seat ring, said hard seal/soft seal combination comprising a ring-shaped elastomeric soft seal portion bonded to a ring-shaped hard seal portion formed from plastic or graphite, said ring-shaped hard seal portion being spaced radially inwardly from the ring-shaped elastomeric soft seal portion;

wherein the ring shaped hard seal portion has a generally annularly shaped second end and a blunted first end and the ring shaped elastomeric soft seal portion is formed from rubber and has a first end forming a bead, a second end, and a generally tubular sidewall connecting the first end with the second end, the second end of the ring shaped elastomeric soft seal portion forming a generally annular wall extending generally radially inwardly from the generally tubular sidewall, the ring shaped hard seal portion being bonded to the ring shaped elastomeric soft seal portion, the generally annular wall of the ring shaped elastomeric soft seal portion being in covering relationship with the generally annular second end of the ring shaped hard seal portion;

wherein the first end of the seat ring further defines a generally circumferentially extending first groove cut in a longitudinal direction into the seat ring from the generally frustoconical surface at the first end of the seat ring, said groove being defined by an inner sidewall, an outer sidewall and a bottom wall, the ring-shaped hard seal portion being positioned against the inner sidewall of the first groove, the ring-shaped elastomeric soft seal portion being positioned against the outer sidewall of the first groove; and wherein the inner sidewall of the first groove has a first generally cylindrical sidewall portion defining a first inner diameter adjacent to the generally frustoconical surface of the tubular member and a second generally cylindrical sidewall portion having a second inside diameter adjacent to the bottom wall of the groove, wherein the second diameter is smaller than the first diameter, and a generally annular wall portion connecting the first generally cylindrical sidewall portion with the second generally cylindrical sidewall portion.

3. A valve seat assembly as in claim 2 wherein the ring-shaped hard seal portion has a generally tubular shape with a first end having an inner chamfer protruding slightly from the frustoconical surface at the first end of the seat ring, said first end being chamfered at an angle of about 45 degrees with respect to the longitudinal axis of the valve seat assembly and the ring shaped elastomeric seal portion has a first end and a second end and forms a layer against the bottom wall of the first groove at its second end and a bead at its first end at least partially protruding from the frustoconical surface of the seat ring a slightly greater distance than the first end of the ring-shaped hard seal portion, said ring shaped elastomeric seal portion further being positioned against the outer sidewall of the first groove.

4. A valve seat assembly as in claim 3 wherein the bead at the first end of the ring-shaped elastomeric seal portion forms a generally radially outwardly extending lip, and wherein the seat ring further defines a generally circumferentially extending groove cut in a generally radial direction into the seat ring from the outer sidewall of the first groove at a location near the frustoconical surface at the first end of the seat ring, said groove being sized and positioned to receive a portion of the bead when the bead is deflected generally radially outwardly.

* * * * *